(12) United States Patent
Desnoyer et al.

(10) Patent No.: US 9,956,964 B2
(45) Date of Patent: May 1, 2018

(54) DEVICE FOR ESTIMATING THE OPERATING TIME OF A MOTOR VEHICLE IN AUTONOMOUS MODE AND ASSOCIATED METHOD

(71) Applicant: RENAULT S.A.S., Boulogne Billancourt (FR)

(72) Inventors: Francois Desnoyer, Paris (FR); Sabine Langlois, Paris (FR); Jean-Francois Forzy, Saint Remy les Chevreuse (FR)

(73) Assignee: RENAULT s.a.s., Boulogne Billancourt (FR)

( * ) Notice: Subject to any disclaimer, the term of this patent is extended or adjusted under 35 U.S.C. 154(b) by 201 days.

(21) Appl. No.: 14/893,835

(22) PCT Filed: May 21, 2014

(86) PCT No.: PCT/FR2014/051183
§ 371 (c)(1),
(2) Date: Jan. 29, 2016

(87) PCT Pub. No.: WO2014/191657
PCT Pub. Date: Dec. 4, 2014

(65) Prior Publication Data
US 2016/0229414 A1    Aug. 11, 2016

(30) Foreign Application Priority Data

May 27, 2013    (FR) ...................... 13 54764

(51) Int. Cl.
*G01C 22/00*    (2006.01)
*B60W 40/12*    (2012.01)
(Continued)

(52) U.S. Cl.
CPC ........ *B60W 40/12* (2013.01); *B60W 50/0097* (2013.01); *B60W 50/14* (2013.01);
(Continued)

(58) Field of Classification Search
CPC .. B60W 50/0097; B60W 50/14; B60W 40/12; B60W 30/12; B60W 30/16;
(Continued)

(56) References Cited

U.S. PATENT DOCUMENTS

| | | | |
|---|---|---|---|
| 2009/0326750 A1 | 12/2009 | Ang | |
| 2012/0310465 A1* | 12/2012 | Boatright | ............... B60Q 1/346 701/25 |
| 2015/0217763 A1* | 8/2015 | Reichel | ............. B60W 50/0098 701/23 |

FOREIGN PATENT DOCUMENTS

| | | |
|---|---|---|
| DE | 10 2011 082 375 A1 | 3/2013 |
| EP | 2 070 788 A1 | 6/2009 |

OTHER PUBLICATIONS

French Search Report dated Apr. 7, 2014 FR 1354764 filed May 27, 2013.

* cited by examiner

*Primary Examiner* — Hussein Elchanti
(74) *Attorney, Agent, or Firm* — Oblon, McClelland, Maier & Neustadt, L.L.P.

(57) ABSTRACT

A method and device for estimating the operating time of a motor vehicle in autonomous mode for at least one route between a departure point and an arrival point. The estimating device is connected to an identifying element and to an element for characterizing portions of roads approved for the operation of the vehicle in autonomous mode, along the at least one route. The estimating device includes a unit for calculating the time during which the vehicle is eligible to operate in autonomous mode depending on the characterization of approved portions of road.

10 Claims, 3 Drawing Sheets

(51) Int. Cl.
    *B60W 50/00*     (2006.01)
    *B60W 50/14*     (2012.01)
    *G01C 21/34*     (2006.01)
    *G05D 1/00*     (2006.01)
    *B60W 30/12*     (2006.01)
    *B60W 30/16*     (2012.01)

(52) U.S. Cl.
    CPC ............ *G01C 21/34* (2013.01); *G05D 1/0088* (2013.01); *B60W 30/12* (2013.01); *B60W 30/16* (2013.01); *B60W 2050/146* (2013.01); *B60W 2550/141* (2013.01); *B60W 2550/22* (2013.01); *B60W 2550/402* (2013.01)

(58) Field of Classification Search
    CPC ....... B60W 2050/146; B60W 2550/22; B60W 2550/402; B60W 2550/141; G05D 1/0088; G01C 21/34; G01C 21/12
    See application file for complete search history.

DEVICE FOR ESTIMATING THE OPERATING TIME OF A MOTOR VEHICLE IN AUTONOMOUS MODE AND ASSOCIATED METHOD

The invention relates to the device and to the method for navigation and for information on the navigation of a motor vehicle. More precisely, the invention relates to the navigation of the vehicles including an autonomous operating mode and to the estimation of the operating time of the motor vehicle in autonomous mode, for at least one route between departure point and an arrival point.

The U.S. Pat. No. 8,260,482 (B1) discloses a motor vehicle including an automatic driving system allowing an autonomous operating mode of the vehicle. The driving system includes a geolocation device for the vehicle, so as to determine the position of the vehicle and the road on which the vehicle travels. This automatic driving system further includes an element for identifying portions of approved road on which the autonomous operating mode of the vehicle is authorized. Moreover, the system includes a display for indicating to the driver if the autonomous operating mode of the vehicle is available or not.

This driving system does not allow the vehicle driver to be able to predict the time during which the vehicle can operate in autonomous mode along a route, and also does not allow other activities to be planned.

DISCLOSURE OF THE INVENTION

The aim of the invention is to solve these problems by proposing a device for estimating the operating time of a motor vehicle in autonomous mode for at least one route between a departure point and an arrival point. According to a main feature of the invention, the estimating device is connected to an identifying element and to an element for characterizing the portions of roads approved for the operation of the vehicle in autonomous mode, along said at least one route, and the estimating device includes a unit for calculating the time during which the vehicle is eligible to operate in autonomous mode depending on the characterization of approved portions of road.

According to additional features of the invention taken separately or in combination:
  the element for characterizing the approved road portions can determine the length and the regulatory speed of the approved road portions;
  the estimating device can include a means of communication with an electronic medium;
  the estimating device can be connected to an element for determining the traffic conditions and the unit for calculating the time during which the vehicle is eligible to operate in autonomous mode can be dependent upon the traffic conditions.

According to a particularly advantageous aspect of the invention, the invention relates to a navigation system for a motor vehicle suitable for operating in an autonomous mode, the navigation system including means for inputting a departure point and arrival point, wherein the navigation system is connected to a device for estimating the autonomous driving mode time according to the invention.

The invention also relates to a method for estimating the autonomous mode time of a vehicle between a departure point and an arrival point. According to a main feature of the invention, the estimating method can include the following steps:

a step for determining at least one route between the departure point and the arrival point,
  a step for identifying portions of road approved for the operation of the vehicle in autonomous mode, along said at least one route,
  a step for characterizing the approved portions of road, and
  a step for estimating the time during which the vehicle is eligible to travel in autonomous mode depending on the characterization of the portions of road.

According to additional features of the invention taken separately or in combination:
  the step for characterizing the approved portions of road can include a step for acquiring the data relating to the length of the approved portions and to the regulatory speeds thereof;
  the estimating method can include a step for acquiring data relating to the traffic conditions along said at least one route and the step for estimating the time can, also, be dependent upon the traffic conditions;
  the estimating method can include a concatenation step for the approved road portions which can be juxtaposed, and a step for filtering the times estimated for concatenated road portions or approved road portions if they have not been concatenated.

According to a particularly advantageous aspect of the invention, the invention relates to a method for determining a route between a departure point and an arrival point for a motor vehicle suitable for operating in an autonomous mode, including:
  a step for acquiring the departure point and the arrival point,
  the implementation of an estimating method according to the invention.

BRIEF DESCRIPTION OF THE FIGURES

The following description with reference to the appended drawings, which are given by way of nonlimiting example, will clearly explain the features of the invention and the implementation thereof.

DESCRIPTION

The invention relates to a device and a method for estimating the operating time of a motor vehicle in autonomous mode for a route, i.e. a motor vehicle including elements for monitoring the various components of the vehicle allowing it to travel on a road without the intervention of the driver. The so-called autonomous vehicle includes an automatic driving device which interacts with a navigation system, the steering of the vehicle, the power train and collision detecting elements.

The implementation of this solution is particularly suitable in a motor vehicle navigation system including an autonomous driving mode, but can also be used on any electronic medium in order to help the driver plan the journey thereof without having to move in the vehicle thereof. The electronic medium can, also, be nomadic and can be connected to a network of the vehicle.

Figure 1:
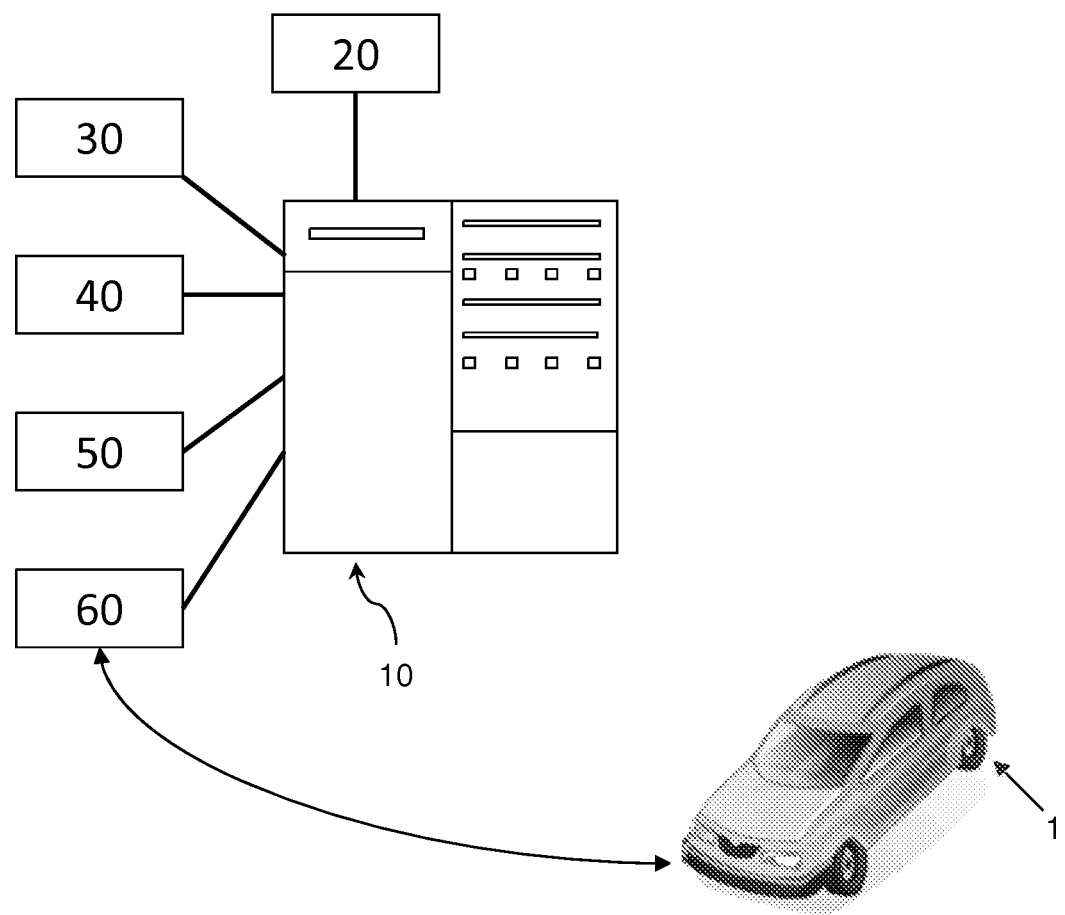
FIG. 1 is a schematic representation of a motor vehicle and of a device according to the invention.

As stated above, the first aspect of the invention is a device 10 for estimating the operating time of a motor vehicle 1 in autonomous mode for at least one route can determine between a departure point A and an arrival point B (FIG. 4), for example in the embodiment shown in FIG. 1 the estimating device 10 is a server 10. In the embodiment presented below, for reasons of clarity, the server 10 determines a route having the shortest total journey time. Of course, according to other embodiments that are not shown, the server 10 can determine several routes according to the shortest times or according to the smallest energy consumptions, the server 10 can also take into account the desired departure time or the desired arrival time, etc.

The server 10 is connected to an identifying element 20 and to an element 30 for characterizing the portions of roads $PC_m$ approved (see FIG. 4) for the operation of the vehicle 1 in autonomous mode along the route.

The identifying element 20 allows recognition of the approved portions of road $PC_m$, where the vehicle 1 can travel in the autonomous mode, from the other so-called traditional road portions. The approved portions of road $PC_m$ are portions of roads $P_n$ (see FIG. 4) known from a road network navigation map which is not incompatible with the motor vehicle 1 autonomous mode.

The incompatibility of a road or of a portion of road can result from various factors, for example:
- legislative: the law does not allow the vehicle 1 to drive using an autonomous mode on certain types of roads or above certain speeds, and/or
- the driving conditions on the road, a parking area due to the fact that there can be a high density of pedestrians, the detection of a roadworks area, a road with alternating traffic, etc.

The element 30 for characterizing the approved portions of road $PC_m$ determines the length and the regulatory speed of the approved road portions $PC_m$. Additionally and advantageously, as shown in FIG. 1, the server 10 is connected to an element 40 for determining the traffic conditions, such as the traffic density or weather conditions, whereby this allows the speed of the vehicle 1 on the portion and therefore the operating time of the vehicle 1 in autonomous mode to be estimated more accurately. In other words, the characterizing element 30 acquires the length and the regulatory speed, and the speed is adjusted by the element 40 for determining the traffic conditions, as a function of the traffic density.

The server 10 includes a unit 50 for calculating the time during which the vehicle 1 is eligible to operate in autonomous mode depending on the characterization of approved portions of road $PC_m$ and, according to the embodiment set out, depending on the traffic conditions.

In the embodiment shown in FIG. 1, the server 10 includes a means 60 for communicating with an electronic medium of the navigation system type (not shown for reasons of clarity) which is on board or nomadic and connected to the network of the vehicle. The communication between the server 10 and the navigation system takes place via a wireless network, for example a 4G network (shown by the arrow in FIG. 1), and therefore the departure point A corresponding to the current position of the vehicle 1 and the arrival point B input by the user are transmitted to the server 10 and the result of the calculating unit 50 can be displayed on the display screen of the navigation system. According to other embodiments, the electronic medium can be a computer or a smart phone optionally connected to the motor vehicle 1.

In the case where the electronic medium is connected to the vehicle 1, the result is displayed on the screen of the electronic medium, allowing the driver to be able to select the route that the latter wishes to take if several roads have been determined. This technical feature is particularly advantageous, whereby the user can directly select the journey, which allows the user to plan activities which do not require the full attention thereof on the road at a moment and/or for a determined moment, for example a telephone call.

The time of the journey on the traditional road portions can be estimated in the same way or by any other device and/or method known to a person skilled in the art.

The invention also relates to a method for determining a route between the departure point A and the arrival point B. This method is implemented, in the embodiment, by the device described above.

Figure 2:
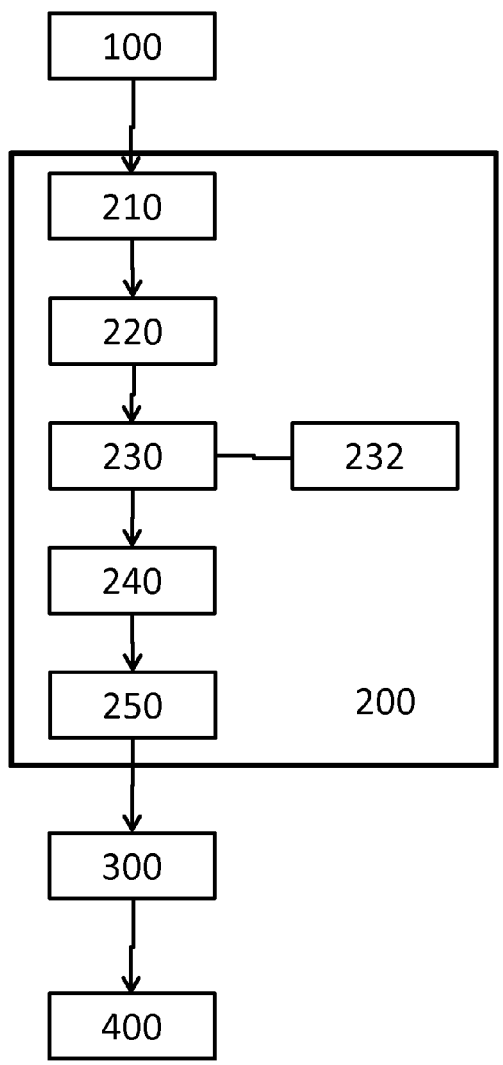
FIG. 2 is an example of a method for determining a route according to the invention.
Figure 3:
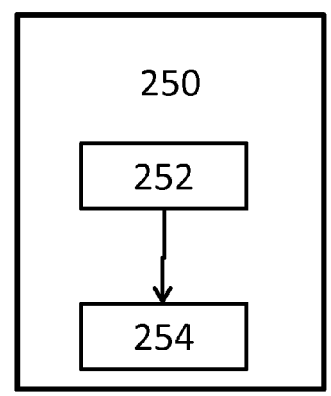
FIG. 3 is a schematic representation of an embodiment of a step of the method of FIG. 2.

As shown in FIG. 2, the determining method includes a step 100 for acquiring the departure point A and the arrival point B (FIG. 4), through input means of the navigation system and transmitted to the server 10 by the communication means 60.

The determining method includes a step 200 for implementing a method for estimating the autonomous mode time of a vehicle 1 between the departure point A and the arrival point B, this step being implemented by the server 10.

The estimating method includes a step 210 for determining at least one route between the departure point A and the arrival point B.

The estimating step includes a step 220 for identifying portions of road $PC_m$ approved for the operation of the vehicle 1 in autonomous mode, along the route. This step is implemented by the identifying element 20.

The estimating method also includes a step 230 for characterizing the portions of approved road $PC_m$. The step for characterizing the portions of approved road $PC_m$ includes a step 232 for acquiring the data relating to the length of the portions and to the regulatory speeds thereof. These steps are implemented by the characterizing element 30.

According to the embodiment set out and in an additional manner to the characterizing step, the estimating step includes a step 240 for acquiring data relating to the traffic conditions along the route and particularly on the portions of approved road $PC_m$. This step is implemented by the element 40 for determining the traffic conditions.

The estimating method comprises a step 250 for estimating the time during which the vehicle 1 is eligible to travel in autonomous mode depending on the characterization of the portions of approved road $PC_m$ and, if the information is available, depending on the data relating to the traffic conditions. The estimating step 250 is implemented by the calculating unit 50 and the result of the estimation is transmitted via the server 10 to the navigation system.

According to an alternative embodiment, the calculating unit 50, after having estimated each of the approved road portions, implements a concatenation step 252 for the portions of approved road $PC_m$ which are juxtaposed, by adding up the estimated times of the portions of approved road which have been concatenated. The calculating unit 50 can then implement a step 254 for filtering the times estimated for concatenated road portions $PK_p$ or approved road portions $PC_n$ if they have not been concatenated, by comparing them with a threshold value, for example 5 minutes. If the estimated time is less than the threshold value then the approved road portion $PC_m$, or the portions of roads if they have been concatenated $PK_p$, are downgraded into traditional road portions. The fact of having concatenated portions allows the portions having excessively short autonomous mode operation estimated times to be spread apart, and this prevents the user from being prompted too frequently to change operating mode of the vehicle 1.

The determining method includes a step 300 for displaying the route and the estimated time, in autonomous operating mode, for the route. According to an additional alternative, the display can show the route, the portions of road where the vehicle 1 is eligible to travel in autonomous operating mode and the estimated time in autonomous operating mode. If there is several routes, then each of the routes is displayed with the estimated autonomous operating time associated with each of the routes.

The determining method includes a step 400 for selecting the route if there is several routes. The selection of the route can be manual, i.e. the user selects the route, automatic or semi-automatic.

The automatic selection can be carried out by comparing the autonomous operating mode estimated total time with a threshold value, for example it must be possible to carry out a third of the total time of the journey in autonomous operation. The automatic selection can also, according to another embodiment, be variable and have varying threshold values, for example by taking into account the diary of the user. For example, the user has supplied information in the diary thereof of a telephone call with the superior thereof following a client meeting for fifteen minutes taking into account the start time and the end time. The semi-automatic selection is the combination of the automatic selection and the manual selection.

An example of implementing the invention, shown in FIGS. 4a-4c, will be described for a route between the departure point A and the arrival point B for the vehicle 1 including an on-board navigation system. The user inputs on the on-board navigation system of the vehicle 1 the arrival point B, the departure point A being, by default, the position at the moment of inputting the arrival point B.

Figure 4A:
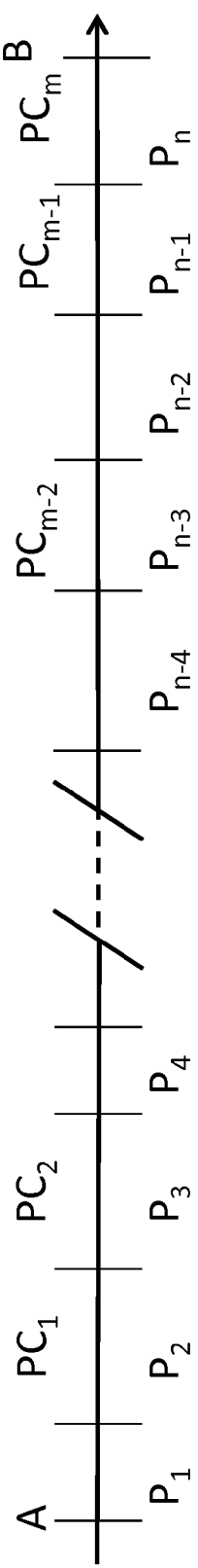
FIG. 4 are schematic representations of examples for implementing the method on a route.
Figure 4B:
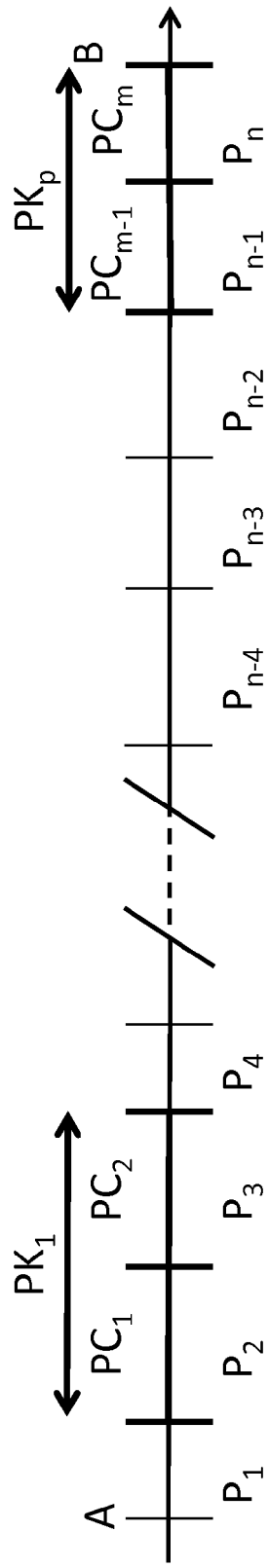
Figure 4C:
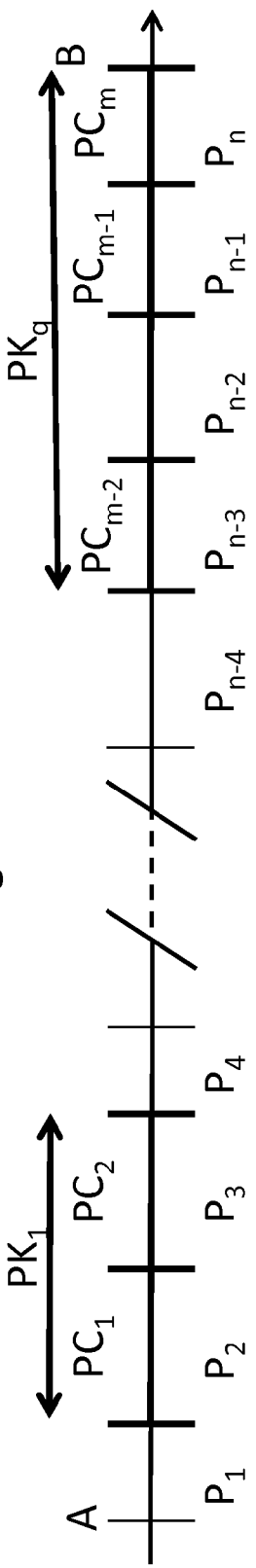

As shown in FIG. 4a, the server 10 determines the route including n portions $P_n$ of road. Each of the portions of road is identified by the identifying element 20 in order to determine which portions are the approved portions $PC_m$, i.e. the portions on which the vehicle 1 can travel using the autonomous mode thereof.

The characterizing element 30 acquires the data relating to the length and to the regulatory speed on each of the approved portions $PC_m$.

In the embodiment, the element 40 for determining the traffic conditions adjusts the speed on the approved portions $PC_m$.

The calculating unit 50 estimates the time for each of the approved portions $PC_m$.

In this embodiment, the calculating unit 50 concatenates the portions of approved road $PK_p$ (parts in bold in FIG. 4b) which are juxtaposed and adds up the times of each of the portions of approved road $PC_m$. The calculating unit 50 filters the portions of approved road $PC_m$ or concatenated road $PK_p$ which have an estimated time less than five minutes, in the example illustrated in FIG. 4b only the portions of approved road $PC_m$ or concatenated road $PK_p$ having an estimated time greater than five minutes are shown, the reference $PC_{m-2}$ having been removed since it did not meet this condition. Then, the calculating unit 50 updates the estimated autonomous mode operating time of the vehicle 1 according to the filtering.

The route and the updated estimated time are transmitted to the on-board navigation system in order to be displayed and allows the launching of the navigation based on the determined and/or selected route.

The invention is not limited to the description of the present embodiment. For example, the embodiment shown in FIG. 4c differs from that shown in FIG. 4b, wherein the calculating unit 50 concatenates the portions of approved road $PK_q$ which are juxtaposed but also the road portion $PC_{n-2}$ which is located between two approved road portions $PC_{m-1}$, $PC_{m-2}$ on the condition that the time of the portion $P_{n-2}$ is less than a specific time, for example 30 seconds or 1 minute. Then, the calculating unit 50 adds up the times of each of the portions of approved road $PC_m$ and that which The calculating unit 50 filters the portions of approved road $PC_m$ or concatenated road $PK_p$ which have an estimated time less than five minutes. In the example illustrated in FIG. 4c, all of the portions of approved road $PC_m$ or concatenated road $PK_q$ having an estimated time greater than five minutes are shown. Compared to the embodiment of FIG. 4b, the reference $PC_{m-2}$ has been retained and the portion of road $P_{n-2}$ has been added to the concatenated road portion $PK_q$ in order to allow a time a longer autonomous mode operation. Then, the calculating unit 50 updates the estimated autonomous mode operating time of the vehicle 1 according to the filtering. The addition of the road portion $P_{n-2}$ can be possible according to various scenarios, for example if legislation requires that the vehicle operating in autonomous mode does not exceed a speed, for example 50 km/h, and that the portion of road is limited to 60 km/h and that it is 150 m long, then the time required to cross this portion of road in autonomous mode is approximately 12 seconds (compared to 10 seconds in manual mode) which is less than 30 seconds. A person skilled in the art can voluntarily choose, when implementing the invention, to vary specific parameters or values in order to maximize the autonomous mode operating time.

According to another embodiment, the approved portions of road are shown on the display of the electronic medium using a different color to the rest of the road, in order to allow the user to be able to identify more easily the areas where the vehicle 1 will be eligible to operate in autonomous mode.

According to another embodiment, the data relating to the traffic conditions is periodically refreshed in order to take into account the progression of the road traffic. Moreover, the element 40 for determining the traffic conditions can incorporate a history of the speeds on the portions of roads.

The main advantage of the invention is in helping the user to more accurately plan the activities thereof when traveling, from any electronic medium once it is connected to the estimating device and without the electronic medium necessarily being in or connected to a motor vehicle 1. Moreover, the device and the method also allow the results to be incorporated into the navigation of a vehicle 1 which can operate using an autonomous operating mode.

The invention claimed is:
1. A server comprising:
circuitry configured to
determine at least one route between a departure point and an arrival point entered by a driver at a user interface of a vehicle,
receive data from an identifying element connected to the server, the data corresponding to recognized approved one or more portions of a road or roads where the vehicle is able to travel in an autonomous driving mode for the determined at least one route,
receive data from a characterizing element connected to the server, the data corresponding to characterizations of the one or more portions of the road or roads approved for operation of the vehicle in the autonomous driving mode, along said determined at least one route, determine an amount of time during which the vehicle is eligible to operate in the autonomous driving mode based on the characterization of the approved one or more portions of the road or roads approved for operation of the vehicle in the autonomous driving mode, along said determined at least one route, and output, from the server, data for display at the vehicle of the determined amount of time during which the vehicle is eligible to operate in the autonomous driving mode for said determined at least one route.

2. The server as claimed in claim 1, wherein the data corresponding to characterizations of the one or more portions of the road or roads approved for operation of the vehicle in the autonomous driving mode, along said determined at least one route, is generated by the characterizing element based on a length and a regulatory speed of the approved one or more road portions.

3. The server as claimed in claim 1, wherein the circuitry is configured to communicate with an electronic medium.

4. The server as claimed in claim 1, wherein the circuitry is configured to receive data from a traffic conditions element connected to the server, the data corresponding to one or more traffic conditions along said determined at least one route, and determine the amount of time during which the vehicle is eligible to operate in the autonomous driving mode is dependent upon the data corresponding to the one or more traffic conditions.

5. The server as claimed in claim 1, wherein the data output for display at the vehicle is for a display associated with a navigation system of the vehicle.

6. A method comprising:

determining at least one route between a departure point and an arrival point entered by a driver at a user interface of a vehicle;

identifying one or more portions of road approved for operation of the vehicle in an autonomous driving mode, along said determined at least one route;

characterizing the approved one or more portions of road;

estimating an amount of time during which the vehicle is eligible to travel in the autonomous driving mode based on the characterization of the approved one or more portions of road approved for operation of the vehicle in the autonomous driving mode, along said determined at least one route; and outputting data for display at the vehicle of the estimated amount of time during which the vehicle is eligible to operate in the autonomous driving mode for said determined at least one route.

7. The method as claimed in claim 6, wherein said characterizing the approved one or more portions of road includes acquiring data relating to a length of the approved one or more portions of road and to regulatory speeds thereof.

8. The method as claimed in claim 7, further comprising:

acquiring data relating to traffic conditions along said at least one route, wherein said estimating the amount of time is dependent upon the data relating to the traffic conditions.

9. The estimating method as claimed in claim 6, further comprising:

concatenating the approved one or more portions of road which are juxtaposed; and filtering the amount of times estimated for the concatenated one or more portions of road or the approved one or more portions of road when they have not been concatenated.

10. A method comprising:

acquiring a departure point and an arrival point entered by a driver at a user interface of a vehicle;

determining at least one route between the entered departure point and the entered arrival point;

identifying one or more portions of road approved for operation of the vehicle in an autonomous driving mode, along said determined at least one route;

characterizing the approved one or more portions of road;

estimating an amount of time during which the vehicle is eligible to travel in the autonomous driving mode based on the characterization of the approved one or more portions of road approved for operation of the vehicle in the autonomous driving mode, along said determined at least one route; and outputting data for display at the vehicle of the estimated amount of time during which the vehicle is eligible to operate in the autonomous driving mode for said determined at least one route.

* * * * *